United States Patent [19]

Okamoto et al.

[11] 3,718,656
[45] Feb. 27, 1973

[54] PYRAZOLO(1.5-A) PYRIDINE DERIVATIVES

[75] Inventors: Toshihiko Okamoto, Bunkyo-ku, Tokyo; Masaaki Hirobe, Setagaya-ku, Tokyo; Seigo Suzue, Itabashi-ku, Tokyo; Yoshio Nagatsu, Urawa-shi, Saitama-ken; Keiichi Ushiyama, Minamisaitama-gun, Saitama-ken; Susumu Satoh, Kita-ku, Tokyo; Tsutomu Irikura, Nerima-ku, Tokyo, all of Japan

[73] Assignee: Kyorin Seigaku Kabushiki Kaisha, Tokyo, Japan

[22] Filed: April 8, 1971

[21] Appl. No.: 132,558

[30] Foreign Application Priority Data

Sept. 25, 1970 Japan .................................. 45/83985

[52] U.S. Cl. ............ 260/295 F, 260/296 H, 424/263, 424/266
[51] Int. Cl. ....................... C07d 31/34, C07d 31/42
[58] Field of Search........................260/295 F, 296 H

*Primary Examiner*—Alan L. Rotman
*Attorney*—Toren & McGeady

[57] ABSTRACT

The present invention provides 2-substituted-3-nitrosopyrazolo[1,5-a]pyridines expressed by the general formula,

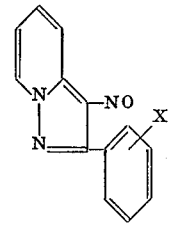

(I)

where X stands for a halogen atom, a lower alkoxy, hydroxy or acetoxy group, and a method for synthesizing the same. The substances of this invention expressed by the general formula (I) exhibit excellent antimicrobial action for example, the tubercle bacillus in vitro and are especially efficacious as medicine for trichomanas disease and supparative inflammation.

9 Claims, No Drawings

PYRAZOLO(1.5-A) PYRIDINE DERIVATIVES

DETAILED EXPLANATION OF INVENTION

The present invention relates to novel compounds, 2-substituted-3-nitrosopyrazolo[1,5-a]pyridines expressed by the general formula (I) and the method for synthesizing the same. More particularly, 2-substituted-3-nitrosopyrazolo [1,5-a]pyridines expressed by the general formula (I) are synthesized by the reaction of 2-substituted-pyrazolo[1,5-a]pyridines expressed by the general formula (II) with nitrous acid to convert the former into corresponding 3-nitroso compounds. The method of synthesis of this invention is shown by a reaction formula as follows:

where X stands for a halogen atom, lower alkoxy, hydroxy or acetoxy group.

As a method to introduce a nitroso group to the 3-position of pyrazolo[1,5-a]pyridines expressed by the general formula (II), the generally employed method of direct nitrosation is preferred in which a more than equimolar amount of nitrosation agent selected from the group consisting of nitrous acid, sodium and potassium salts of nitrous acid, ethyl, butyl and amyl ester of nitrous acid and nitrosyl chloride is reacted in water or an organic solvent containing acetic acid or a mineral acid.

The raw material of this invention as described above, expressed by the general formula (II), is a novel compound and is prepared by the Bower's process (J. Chem. Soc., 4510 (1957)) or by the process newly developed by the present inventors in which a Schiff base of 1-amino-2-picalinium salt is oxidized for ring formation or 1-acylimido-2-picoline is dehydrated for ring formation.

2-Substituted-3-nitrosopyrazolo[1,5-a]pyridines, prepared as mentioned above, expressed by the general formula (I) exhibit excellent antimicrobial action for example, the tubercle bacillus in vitro and are especially efficacious as medicine for trichomonas disease and suppurative inflammation as shown in the following table.

ANTIBACTERIAL TEST OF
2-Substituted-3-nitrosopyrazolo[1,5-a]pyridine (I)
(minimum concentration for growth inhibition, γ/ml)

| Compounds of this invention X | B. subtilis | S. aureus J189 | P. chryso- genus | T. foetus | M. tuberculosis Aoyama B strain |
|---|---|---|---|---|---|
| 1. meta-Cl | 0.5 > | 1 | 1 | 0.4 | 1 |
| 2. meta-Br | 1 | 5 | 5 | 2 | 10 |
| 3. para-Cl | 0.2 | 0.78 | 10 | 2 | 2.5 |
| 4. para-Br | 1 > | 1 > | 10 | 5 | 2.5 |
| 5. para-OH | 5 | 5 | 5 > | 20 | 1 |
| 6. para-O.CO.CH$_3$ | 5 | 5 | 5 | 20 | 2.5 |
| 7. ortho-OCH$_3$ | 1 > | 1 | 5 | 4 | 2.5 |
| 8. meta-OCH$_3$ | 1 | 5 | 1 | 2 | 1 |
| Compounds for Comparison | | | | | |
| 9. (Anti-tubercular medicine) Ethionamide | | | | | 10 |
| 10. Medicine of trichomonas disease) Metronidazole | | | | | 2.5 |

Example 1

300 Milligrams (0.0013 mole) of 2-(p-chlorophenyl)pyrazolo[1,5-a]pyridine was dissolved in 8ml of glacial acetic acid and 1.8ml (0.0013 mole) of an aqueous solution of sodium nitrite (1g of the compound in 20ml of water) was added dropwise at the room temperature under stirring. Stirring was continued for additional 2 hours, then yellowish green crystals deposited were separated by filtration, dissolved in 20ml chloroform, washed with an aqueous solution of sodium carbonate and dried with anhydrous sodium sulfate. When chloroform was distilled bluish green crystals were obtained. Recrystallization from benzene gave 200mg (60 percent) of 2-(p-chlorophenyl)-3-nitrosopyrazolo[1,5-a]pyridine as green needles. Melting point: 201.5° – 202.5°C.

Analysis: as $C_{13}H_8N_3OCl$
Calculated; C: 60.59% H: 3.13% N: 16.31%
Found; C: 60.38% H: 3.36% N: 16.67%

EXAMPLE 2

2-(p-Bromophenyl)pyrazolo[1,5-a]pyridine was reacted and treated in the same manner as in Example 1 and 2-(p-bromophenyl)-3-nitrosopyrazolo[1,5-a]pyridine was obtained. Melting point: 198° – 199°C, yield: 93 percent.

Analysis: as $C_{13}H_8N_3OBr$
Calculated; C: 51.68% H: 2.67% N: 13.91%
Found; C: 51.60% H: 2.75% N: 13.86%

Example 3

2-(m-Bromophenyl)pyrazolo[1,5-a]pyridine was reacted and treated in the same manner as in Example 1 and 2-(m-bromophenyl)-3-nitrosopyrazolo[1,5-a]pyridine was obtained. Melting point: 209° – 211°C, yield: 64 percent.

Analysis: as $C_{13}H_8N_3OBr$
Calculated; C: 51.68% H: 2.67% N: 13.91%
Found; C: 51.65% H: 2.82% N: 13.80%

Example 4

2-(o-Methoxyphenyl)pyrazolo[1,5-a]pyridine was reacted and treated in the same manner as in Example 1 and 2-(o-methoxyphenyl)-3-nitrosopyrazolo[1,5-a]pyridine was obtained. Melting point: 144° – 145°C, yield: 73 percent.

Analysis: as $C_{14}H_{11}N_3O_2$
Calculated; C: 66.39% H: 4.38% N: 16.59%
Found; C: 66.14% H: 4.22% N: 16.56%

Example 5

2-(m-Chlorophenyl)pyrazolo[1,5-a]pyridine was reacted and treated in the same manner as in Example 1 and 2-(m-chlorophenyl)-3-nitrosopyrazolo[1,5- a]pyridine was obtained. Melting point: 215° – 216°C, yield: 90 percent.

Analysis: as $C_{13}H_8N_3OCl$
Calculated; C: 60.59% H: 3.13% N: 16.31%
Found; C: 60.33% H: 3.28% N: 16.55%

Example 6

2-(p-Acetoxyphenyl)pyrazolo[1,5-a]pyridine was reacted and treated in the same manner as in Example 1 and 2-(p-acetoxyphenyl)-3-nitrosopyrazolo[1,5-a]pyridine was obtained. Melting point: 188° – 189°C, yield: 89 percent.

Analysis: as $C_{15}H_{11}N_3O_3$
Calculated: C: 64.05% H: 3.94% N: 14.94%
Found: C: 64.12% H: 3.83% N: 15.12%

Example 7

2-(p-Hydroxypehnyl)pyrazolo[1,5-a]pyridine was reacted and treated in the same manner as in Example 1 and 2-(p-hydroxyphenyl)-3-nitrosopyrazolo[1,5-a]pyridine was obtained. Melting point: 266° – 270°C, yield: 92 percent.

Analysis: as $C_{13}H_9N_3O_2$
Calculated: C: 65.26% H: 3.78% N: 17.57%
Found: C: 65.50% H: 3.85% N: 17.37%

Example 8

2-(m-Methoxyphenyl)pyrazolo[1,5-a]pyridine was reacted and treated in the same manner as in Example 1 and 2-(m-methoxyphenyl)-3-nitrosopyrazolo[1,5-a]pyridine was obtained. Melting point: 152° – 154°C, yield: 81 percent.

Analysis: as $C_{14}H_{11}N_3O_2$
Calculated: C: 66.39% H: 4.38% N: 16.59%
Found: C: 66.21% H: 4.21% N: 16.44%

Example 9

A mixture of 3.47g of 1-(m-chlorobenzalamino)-2-picolinium iodide (III: X = m-Cl; mp. 179° – 180°C, yellow needles from EtOH) and 2.5g of iodine in 50ml of pyridine was refluxed for 4 hr. After removal of the excess reagents, the resulting dark mass was chromatographed on silica gel using benzene as eluent to give 1.49g of 2-(m-chlorophenyl)pyrazolo[1,5-a]pyridine, which was recrystallized from AcOEt as colorless needles, mp. 128° – 129°C.

The same treatment of 1-( various substituted benzalamino)-2-picolinium iodides (III) as for 1-(m-chlorobenzalamino)-2-picolinium iodide (III: X = m-Cl) gave 2-(various substituted phenyl)pyrazolo[1,5-a]pyridines (II) as shown in the following Table.

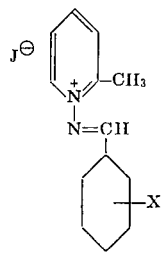

| X | (III) *a mp(°C) | (II) mp(°C) | Recryst. solvent | Yield of II |
|---|---|---|---|---|
| p-Cl | 176–177 | 178–179 | AcOEt | 43% |
| p-Br | 161–164 | 193–194 | AcOEt | 52% |
| m-Br | 154–157 | 116–118 | AcOEt | 48% |
| o-CH₃O | 158–160 | oil | | 70% |
| p-CH₃COO | – | 142–143 | AcOEt | 98% *b |
| p-HO | 196–197 | 204–205 | MeOH | 27% |
| m-CH₃O | 149–152 | 65–66 | MeOH | 62% |

*a) recrystallized from EtOH as pale yellow needles
*b) prepared by the reaction of II(X=p-OH) with acetic anhydride

Example 10

To an ice-cooled solution of 2.46g of 1-(m-chlorobenzoylimino)-2-picoline (mp. 88°C, colorless needles from AcOEt-n-hexane) in 38ml of pyridine was added gradually 3.8ml of $POCl_3$. After the addition was completed, the reaction mixture was refluxed for 5 hr. and then concentrated to dryness under reduced pressure. The residual dark mass was treated with water and extracted thoroughly with $CH_2Cl_2$. The $CH_2Cl_2$ extract was washed with water, dried ($Na_2SO_4$) and distilled to give a dark residue, which was chromatographed on silica gel using benzene as eluent to give 0.516g of 2-(m-chlorophenyl)pyrazolo[1,5-a]pyridine, which was identical with the sample obtained in Example 9 by mixed mp. determination and infrared spectra comparison.

What is claimed is:

1. 2-Substituted-3-nitrosopyrazolo[1,5-a]pyridines expressed by the following general formula (I),

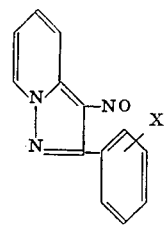

(I)

where X stands for a halogen atom, a lower alkoxy, hydroxy or acetoxy group.

2. 2-(p-Chlorophenyl)-3-nitrosopyrazolo [1,5-a] pyridine.

3. 2-(p-Bromophenyl)-3-nitrosopyrazolo [1,5-a] pyridine.

4. 2-(m-Bromophenyl)-3-nitrosopyrazolo [1,5-a] pyridine.

5. 2-(o-Methoxyphenyl)-3-nitrosopyrazolo [1,5-a] pyridine.

6. 2-(m-Chlorophenyl)-3-nitrosopyrazolo [1,5-a] pyridine.

7. 2-(p-Acetoxyphenyl)-3-nitrosopyrazolo [1,5-a] pyridine.

8. 2-(p-Hydroxyphenyl)-3-nitrosopyrazolo [1,5-a] pyridine.

9. 2-(m-Methoxyphenyl)-3-nitrosopyrazolo [1,5-a] pyridine.

* * * * *